US005915972A

United States Patent [19]

Tada

[11] Patent Number: 5,915,972

[45] Date of Patent: Jun. 29, 1999

[54] DISPLAY APPARATUS FOR KARAOKE

[75] Inventor: Yukio Tada, Hamamatsu, Japan

[73] Assignee: Yamaha Corporation, Hamamatsu, Japan

[21] Appl. No.: 08/789,009

[22] Filed: Jan. 27, 1997

[30] Foreign Application Priority Data

Jan. 29, 1996 [JP] Japan .................................... 8-013243

[51] Int. Cl.[6] ............................... A63H 5/00; G09B 5/00; G10H 7/00

[52] U.S. Cl. .................................. 434/307 A; 434/307 R; 84/609; 84/477 R; 386/46; 348/564

[58] Field of Search ....................... 434/118, 307 R–309, 434/318, 365; 84/477 R, 601–615, 625, 630, 631, 645, 658; 348/7, 12, 17, 488, 478, 473, 552–554, 564, 569, 571, 678; 345/87, 121, 327, 473; 360/32, 33.1, 72.2, 77.01

[56] References Cited

U.S. PATENT DOCUMENTS 5,574,243 11/1996 Nakai et al. .............................. 84/609
5,621,182 4/1997 Matsumoto ..................... 434/307 A X
5,631,433 5/1997 Iida et al. ................................. 84/610
5,663,514 9/1997 Usa ....................................... 84/658 X
5,741,992 4/1998 Nagata ...................................... 84/631
5,772,252 7/1998 Tada ................................ 434/307 A X
5,804,752 9/1998 Sone et al. ............................ 369/53 X
5,808,224 9/1998 Kato ........................................... 84/609
5,810,603 9/1998 Kato et al. .......................... 434/307 A
5,824,935 10/1998 Tanaka ..................................... 84/631
5,827,990 10/1998 Fujita .............................. 434/307 A X
5,847,303 12/1998 Matsumoto ............................... 84/610

*Primary Examiner*—Joe H. Cheng
*Attorney, Agent, or Firm*—Pillsbury Madison & Sutro LLP

[57] ABSTRACT

In a karaoke display apparatus having a monitor 19 which displays words in time to a progress of a performance, a CPU 10 supplies in time sequence polygon fundamental data for determining shapes of polygons and the like and a motion data for determining motions of the polygons in time to the progress of the performance by producing musical tones. A DSP in a video circuit 18 renders an image configured by a plurality of polygons in accordance with the supplied polygon fundamental data and motion data, and synthesizes the rendered image with words. The synthesized image and words are output to the monitor 19.

3 Claims, 3 Drawing Sheets

MOTION DATA

| TIME | $t_0$ | $t_1$ | $t_2$ | ...... | $t_n$ |
|---|---|---|---|---|---|
| POLYGONS 1 COORDINATE DATA | ... | ... | ... | ...... | ... |
| POLYGONS 2 COORDINATE DATA | ... | ... | ... | ...... | ... |
| POLYGONS 3 COORDINATE DATA | ... | ... | ... | ...... | ... |
| ⋮ | ⋮ | ⋮ | ⋮ | ⋮ | ⋮ |
| POLYGONS m COORDINATE DATA | ... | ... | ... | ...... | ... |

FIG. 2

MUSIC PIECE DATA

| |
|---|
| HEADER |
| PERFORMANCE DATA |
| WORD DATA |
| MOTION DATA |

FIG. 3

MOTION DATA

| TIME | $t_0$ | $t_1$ | $t_2$ | ....... | $t_n$ |
|---|---|---|---|---|---|
| POLYGONS 1 COORDINATE DATA | ... | ... | ... | ....... | ... |
| POLYGONS 2 COORDINATE DATA | ... | ... | ... | ....... | ... |
| POLYGONS 3 COORDINATE DATA | ... | ... | ... | ....... | ... |
| ⋮ | ⋮ | ⋮ | ⋮ | ⋮ | ⋮ |
| POLYGONS m COORDINATE DATA | ... | ... | ... | ....... | ... |

DISPLAY APPARATUS FOR KARAOKE

BACKGROUND OF THE INVENTION

1. Field of the Invention

The invention relates to a display apparatus for karaoke which displays a human image configured by polygons by means of a dance arrangement, or the like in time to a progress of a performance.

2. Related art

In a so-called karaoke apparatus, when the user selects a desired music piece, performance sounds of the music piece and the like are reproduced, and also a background image (a video) and words of the music piece are displayed on a monitor. At this time, in order to visually understand the progress of the performance, the color of the displayed characters of the words is often changed in time to a progress of the performance.

Such an operation is conventionally conducted by simply reproducing an optical disk storing video signals and audio signals. In recent years, the operation is sometimes conducted by communication. For example, a host station is connected to a karaoke apparatus functioning as a terminal station via a telephone line network, or the like. The host station transfers performance data of a music piece which is selected in the terminal, and other data. The terminal station implements data such as musical-tone data for defining events of musical tones in time sequence, and words data for designating a display of characters in the music piece and a change of the color thereof, in time to the progress of the performance. As a result, the karaoke apparatus functioning as a terminal station produces sounds according to the musical-tone data, and displays characters and changes the color according to the words data. In this case, the background image is provided by, for example, separately reproducing an image corresponding to the genre of the selected music piece.

In a conventional karaoke apparatus, however, only a limited number of functions such as those of reproducing performance tones and displaying characters are carried out even in the case where the apparatus is of the optical type or the communication type. This produces a problem in that a rich atmosphere cannot be sufficiently produced.

SUMMARY OF THE INVENTION

The invention has been conducted in view of the above-mentioned problem. It is an object of the invention to provide a karaoke apparatus which can carry out not only the functions of reproducing performance tones and displaying characters but also other functions such as a display of a dance arrangement for a music piece, thereby enabling the apparatus to carry out various functions.

In order to solve the problem, the present invention is provided a display apparatus for karaoke comprising display means for displaying words in time to a progress of a performance, wherein the apparatus further comprises data supplying means for supplying shape data for determining shapes of polygons and motion data for determining motions of the polygons in time sequence in time to the progress of the performance by musical-tone generation; rendering means for rendering an image configured by a plurality of polygons in accordance with the supplied shape data and motion data; and synthesizing means for synthesizing the rendered image with the words, thereby displaying the synthesized image and words on the display means.

According to the present invention, the data supplying means supplies shape data for each music piece or each genre.

According to the present invention, an image is displayed together with words on the display means. The image is configured by a plurality of polygons, and rendered by the rendering means in accordance with the shape data and the motion data which are supplied in time sequence from the data supplying means in time to a progress of a performance. When the motion data is configured in such a manner that the image performs a dance, for example, the image with a dance arrangement is displayed together with the words on the display means in time to the progress of the performance.

According to the present invention, polygons which constitute the image can be changed for each music piece or each genre.

BRIEF DESCRIPTION OF THE DRAWINGS

FIG. 2 is a diagram showing the configuration of a music-piece data in the karaoke apparatus;

FIG. 3 is a diagram showing the configuration of a motion data in the karaoke apparatus.

DETAILED DESCRIPTION OF THE PREFERRED EMBODIMENTS

1: Whole configuration

Figure 1:
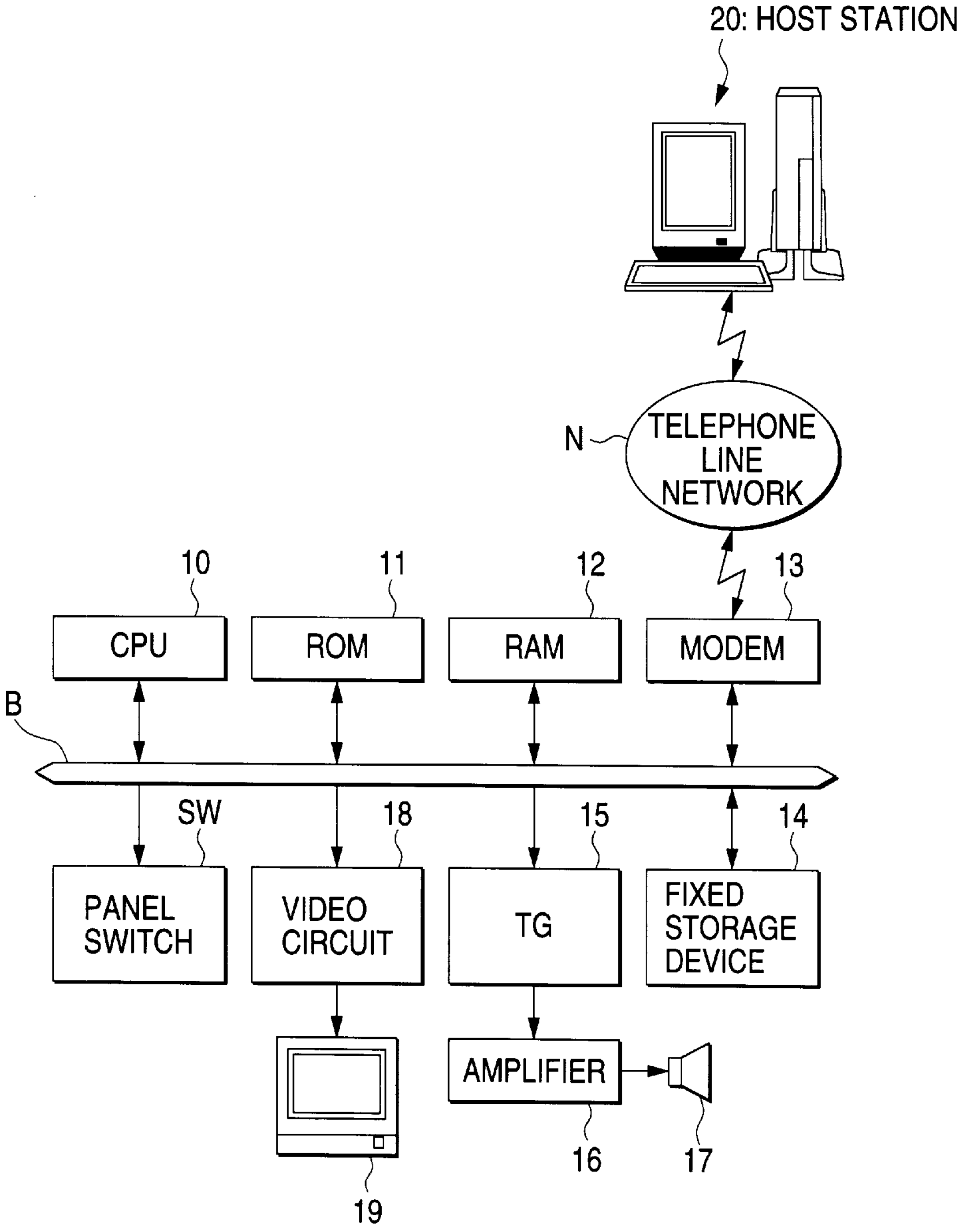
FIG. 1 is a block diagram showing the configuration of a karaoke apparatus of an embodiment of the invention.

Hereinafter an embodiment of the invention will be described with reference to the drawings. FIG. 1 is a block diagram showing the configuration of a karaoke apparatus of the embodiment.

In the figure, the reference numeral 10 designates a CPU which controls components connected to the CPU via bus B. The reference numeral 11 designates a ROM which stores fundamental programs used in the CPU 10. The reference numeral 12 designates a RAM which temporarily stores data and the like used for the control by the CPU 10.

The reference numeral 13 designates a modem which transmits data to and receives data from a host station 20 via a telephone line network N. The reference numeral 14 designates a fixed storage device constituted by an HDD (hard disk drive), etc. The fixed storage device 14 stores main programs and the like used in the CPU 10. The fixed storage device 14 in the embodiment stores also polygon fundamental data for displaying polygons as described later.

The reference numeral 15 designates a tone generator circuit (TG: Tone Generator) which synthesizes musical tones based on a performance data of a music-piece data. The reference numeral 16 designates an amplifier which amplifies a musical-tone signal synthesized by the tone generator circuit 15, so that sounds are produced to the outside through a loud speaker 17.

The reference numeral 18 designates a video circuit constituted by a DSP, a V-RAM, an RAMDAC, and the like. In the video circuit, data which are supplied in time sequence by the CPU 10 are translated by the DSP. The translated contents are written into the V-RAM corresponding to a display area of a monitor 19, and read out in accordance with the scanning frequency of the monitor 19. The read out contents are converted into an analog signal (video signal) by the RAMDAC. The analog signal is supplied to the monitor 19. Thus, the monitor 19 can conduct a display corresponding to the data written into the V-RAM.

The reference symbol SW designates a panel switch. The panel switch SW is configured by a switch which is operated by the user to select a desired music piece, operating devices for setting values such as a volume and a scale, and other devices. The setting information is supplied to the CPU 10.

1-1: Polygon fundamental data

In the embodiment, a virtual human image is displayed on the monitor, and the motion of the human image is controlled in time to the progress of a performance. If a fine human image is to be rendered, a huge amount of data is required, thereby increasing the load. For this reason, portions of the human image are displayed in a simplified manner by using polygons. Data relating to shapes of polygons and the like are stored in the fixed storage device 14 as polygon fundamental data.

The polygon fundamental data are mainly configured by a polygon shape data, a polygon rule data, and a joint data, for each of the portions of the human image. The polygon shape data is a data for determining shapes of polygons which represent m portions of the human image. The polygon rule data is a data for determining rendering conditions when the respective polygons are rendered. The joint data is a data indicating joint conditions among polygons. In other words, the joint data defines joints in a virtual person.

Plural sets of polygon fundamental data are previously prepared. In the selection of a karaoke music piece, a polygon fundamental data indicative of a copy or deformation of a person who is most suitable for the selected music piece (e.g., a singer of the music piece), or that which is arbitrarily selected by the user is designated. The sets of polygon fundamental data may be stored for each music piece, for each singer, for each genre, and the like. In this case, when a karaoke music piece is selected, one polygon fundamental data may be automatically selected.

The video circuit 17 can render a virtual human image by using the polygon fundamental data. In order to control the motion of the polygon image in time to the progress of the performance, a motion data which is described later is used.

1-2: Music-piece data

Referring to FIG. 2, the configuration of a music-piece data in the embodiment will be described. As shown in the figure, the music-piece data is configured by a header indicating configuration information of the data and the like, a performance data in which data for defining the contents of musical tones to be produced are recorded, for example, in the form of MIDI, a words data in which words information to be displayed in time to the progress of the performance is recorded in time sequence, and a motion data which applies a motion to the above-mentioned polygon image.

The performance data is configured by a plurality of tracks corresponding to playing parts. Each track is an aggregation of event data indicating the contents of events which should occur in a corresponding playing part (for example, tone generation and tone deadening). Duration data respectively indicating time periods of the events are inserted between the event data. In a case where a period of an event corresponds to a quarter note of a music piece, for example, a value of "24" is inserted.

The words data is configured by, for example, various kinds of data such as characters to be displayed, the display timing of the characters, and a font, a format, and a color change timing of the characters to be displayed.

1-2-1: Motion data

Next, the configuration of the motion data in the music-piece data will be described in detail with reference to FIG. 3.

In the figure, polygons 1 to m correspond to portions of a human image, respectively. The period between times $t_i$ and $t_{i-1}$ is set to be a constant value of $\delta T$ (where i is an integer which satisfies a condition of $1<i\leqq M$).

As shown in the figure, the motion data is described in the following manner. In the period from the performance start time $t_0$ to the performance end time $t_n$, coordinate data indicating coordinates where the polygons 1 to m are to be displayed are moved in time to the progress of the performance.

As the motion corresponding to a music piece, for example, a dance arrangement of a singer, a singing style, and the like may be employed.

2: Operation

Next, the operation of the embodiment will be described. First, the user who wishes to sing a song selects a desired karaoke music piece by operating the operation panel SW. Then the CPU 10 requires the host station 20 to transfer the music-piece data of the selected music piece, via the modem 13 and the telephone line network N. When the requirement is received, the host station 20 retrieves the corresponding music-piece data and transfers the data to the karaoke apparatus functioning as a terminal station. When the reception of the data is detected, the CPU 10 loads the corresponding music-piece data and the polygon fundamental data corresponding to the selected music piece into the RAM 12.

When the performance start is instructed under this situation via the panel switch SW or the like, the CPU 10 executes the following processing.

The CPU 10 first conducts the processing for the performance data. Specifically, the CPU 10 conducts the interruption twenty four times per quarter note of the music piece. Each time when the interruption is conducted once, the duration data of the performance data is decremented by "1." When the duration data is reduced to "0," this means that the progress of the performance reaches the timing when the processing for the next event data is to be conducted. Thus, the CPU 10 conducts the processing for the event data.

When the event data is a note-on event, for example, the data is transferred to the tone generator circuit 15. The tone generator circuit 15 then generates a musical tone defined by the note-on event data.

After the CPU 10 executes the processing for the event data, the CPU 10 reads a value of the duration data located next to the event data in order to be ready for the next event.

By contrast, when the duration data is not "0," this means that the progress of the performance has not yet reached the timing when the processing for the next event data is to be conducted. Thus, the CPU 10 conducts no processing for the performance.

The CPU 10 executes the above-described processing for each of the tracks.

Secondly, the CPU 10 executes processing for the words data. Specifically, the CPU 10 refers to a data indicating a timing among various kinds of data included in the words data. When the progress of the performance reaches the timing, the CPU 10 transfers data relating to the words to be displayed at the timing, to the video circuit 18. On the other hand, the DSP of the video circuit 18 rewrites the V-RAM in accordance with the contents defined in the transferred data.

Accordingly, the words of the music piece are displayed on the monitor 19 and the color of the words is sequentially changed in time to the progress of the performance. As a result, the user can visually understand the progress of the performance.

Thirdly, the CPU executes processing for the motion data. Specifically, the CPU 10 transfers the polygon fundamental data loaded into the RAM 12 and the coordinate data of the polygons 1 to m at time $t_0$ to the video circuit 18. The DSP of the video circuit 18 writes the data of a polygon image into the V-RAM in accordance with the rules of the polygon fundamental data and the coordinate data of the polygons l to m. Thus, the polygon image configured by the polygons l to m is displayed on the monitor 19 in synchronization with the karaoke performance and the display of the words.

When the performance is started and time $t_1$ is reached, the CPU 10 transfers the coordinate data of the polygons l to m at time $t_1$ to the video circuit 18. The DSP of the video circuit 18 similarly writes the data of a polygon image into the V-RAM in accordance with the rule of the polygon fundamental data and the coordinate data of the polygons l to m, whereby the polygon image is displayed on the monitor 19.

Thereafter, the above-described operation is similarly repeated for each time period $\delta T$. That is, when the performance is started and time $t_i$ is reached, the CPU 10 transfers the coordinate data of the polygons l to m at time $t_i$ to the video circuit 18. The DSP of the video circuit 18 writes data of a polygon image into the V-RAM.

Figure 4:
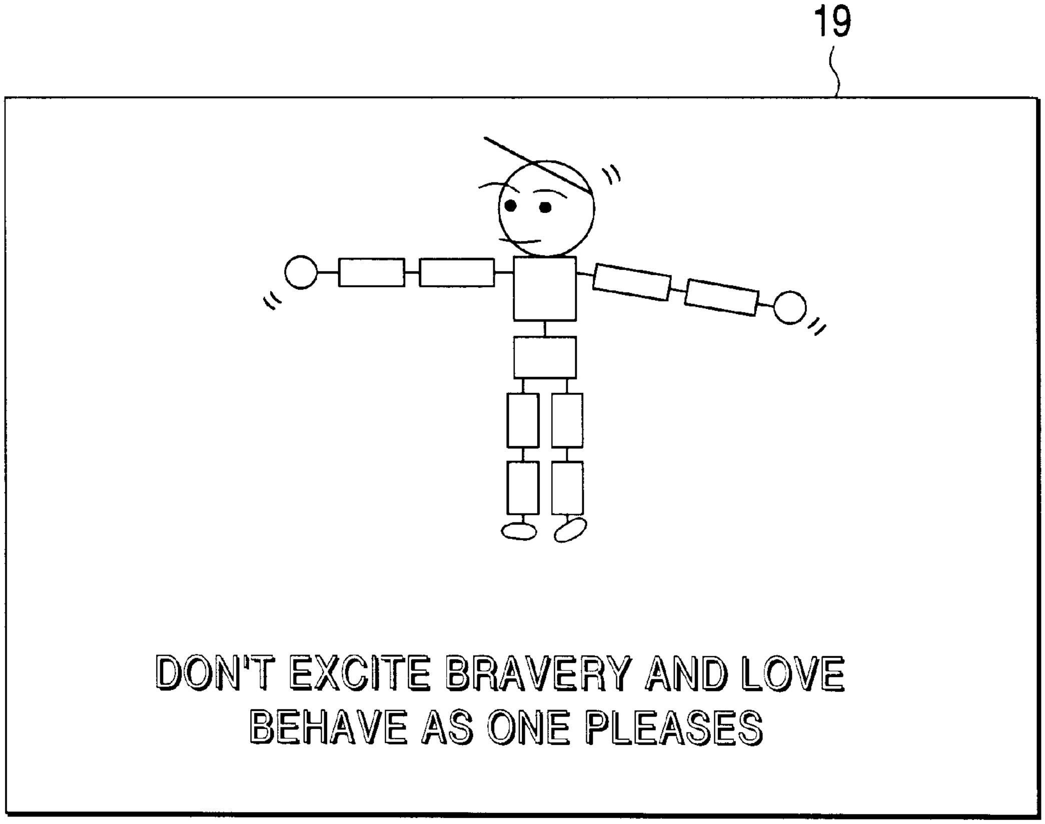
FIG. 4 is a view showing an example of a display in the karaoke display apparatus.

As a result, for example, as shown in FIG. 4, a polygon image is displayed on the monitor 19 together with the words which are displayed in time to the progress of the performance.

Actually, the load of the above-described processing for displaying a polygon image is very heavy. In some cases, therefore, m polygons cannot be rendered in the time period $\delta T$. If such cases occur several times, the motion of the polygon image does not accord with the progress of the performance.

To comply with this, in the embodiment, the condition of writing data into the V-RAM is periodically monitored. If the writing is not performed up to the polygon m, the following processing is executed. That is, the rendering of the polygons l to m at time ti is skipped several times, and the display is executed by using the motion data which accords with the playing time by the performance data.

As a result, the number of rendered images per unit time is reduced, and the motion of the polygon image is somewhat unnatural, but the motion which accords with the progress of the performance by the performance data can be ensured.

According to the karaoke apparatus of the embodiment, a polygon image with motion is displayed together with the words in time to the progress of the performance. This can contribute to a rich atmosphere.

3: Modifications

In the embodiment, the video circuit 18 is connected to the CPU 10 via the bus B which is usually used in the field. In general, a huge amount of data must be transferred in a short time period in order to realize real-time display of a polygon image. In addition, the rendering of polygons necessitates a DSP or the like with high computing ability. Thus, it is desirable that a device which is tailored to the polygon rendering (such as a 3D graphic engine) is used as the DSP of the video circuit 18 and connected to the CPU 10 via a dedicated bus (e.g., a PCI or the like).

In the video circuit 18, the V-RAM is used. Alternatively, a D-RAM which has a single port and is inexpensive may be used. In the alternative, it is necessary to conduct the control in such a manner that the cycles of writing and reading do not collide with each other.

Moreover, a video signal may be externally input, and synthesized with the polygon image and the words.

Furthermore, in the embodiment, the viewing point of the rendered polygon image is fixed. In the same manner as the motion data, a data for determining the viewing point may be disposed in a dedicated track and supplied in synchronization with the performance. In this configuration, the viewing point may be controlled by the user by operating a predetermined button or the like. Alternatively, the viewing point may be changed in accordance with performance data. In the latter case, for example, an intermission is detected from the performance data, and the viewing point may be changed in the intermission.

As described above, according to the invention, an image with a dance arrangement is displayed in time to the progress of a performance, and hence it is possible to provide functions other than those of performing tones, displaying characters, and the like. As a result, the present apparatus can greatly contribute to a rich atmosphere.

What is claimed is:

1. A display apparatus for karaoke comprising:

display means for displaying words in time to a progress of a performance;

data supplying means for supplying shape data for determining shapes of polygons and motion data for determining motions of the polygons in time sequence in time to the progress of the performance by musical-tone generation;

rendering means for rendering an image configured by a plurality of polygons in accordance with the supplied shape data and motion data; and synthesizing means for synthesizing the rendered image with the words, thereby displaying the synthesized image and words on said display means.

2. A display apparatus for karaoke according to claim 1, wherein said data supplying means supplies shape data for each music piece or each genre.

3. A display apparatus for karaoke according to claim 1, further comprising:

inspection means for inspecting the application of the shape data and the motion data.

* * * * *